(12) United States Patent
Li et al.

(10) Patent No.: US 9,120,088 B2
(45) Date of Patent: Sep. 1, 2015

(54) HEAVILY DOPED METAL OXIDES AND METHODS FOR MAKING THE SAME

(75) Inventors: Qi Li, Shanyang (CN); Jian-Ku Shang, Mahomet, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1204 days.

(21) Appl. No.: 12/994,437

(22) PCT Filed: May 13, 2009

(86) PCT No.: PCT/US2009/043689
§ 371 (c)(1),
(2), (4) Date: Aug. 24, 2011

(87) PCT Pub. No.: WO2009/148779
PCT Pub. Date: Dec. 10, 2009

(65) Prior Publication Data
US 2011/0301018 A1 Dec. 8, 2011

Related U.S. Application Data (60) Provisional application No. 61/057,050, filed on May 29, 2008.

(51) Int. Cl.
*C01G 23/047* (2006.01)
*B01J 35/00* (2006.01)
(Continued)

(52) U.S. Cl.
CPC .............. *B01J 35/004* (2013.01); *B01J 21/063* (2013.01); *B01J 27/24* (2013.01); *B01J 37/0226* (2013.01);
(Continued)

(58) Field of Classification Search
CPC .......... B01J 37/34; B01J 37/344; B01J 37/08; B01J 27/24; B01J 21/06; B01J 21/063; B01J 35/004; B01J 35/02; C01G 23/04; C01G 23/047; C01G 19/02
USPC ............. 502/5, 242, 224, 174, 200, 100, 202; 428/426, 691, 698, 701, 702, 704; 423/385, 598, 610; 252/520.1, 520.2, 252/521.5
See application file for complete search history.

(56) References Cited

U.S. PATENT DOCUMENTS 4,591,409 A    5/1986  Ziem et al.
5,260,094 A *  11/1993 Giannelis et al. ................ 427/79
(Continued)

FOREIGN PATENT DOCUMENTS

| EP | 1 205 245 | 5/2002 | |
| JP | 2004/000988 | 1/2004 | |
| JP | 2004000988 | * 1/2004 | ............... B01J 35/02 |
| WO | 2009/148779 | 12/2009 | |
| WO | 2010/104656 | 9/2010 | |

OTHER PUBLICATIONS

Hsu et al, "Preparation and Characterization of Nitrogen-Doped Titanium Dioxide," Journal of Nanoscience and Nanotechnology vol. 7, 3104-3110, 2007.*
(Continued)

*Primary Examiner* — Colleen Dunn
(74) *Attorney, Agent, or Firm* — Brinks Gilson & Lione (57) ABSTRACT

A method of making a doped metal oxide includes heating a first doped metal oxide by rapid thermal annealing, to form a second doped metal oxide. The crystal structure of the second doped metal oxide is different from the crystal structure of the first doped metal oxide. The method may provide a doped titanium oxide, where the atomic ratio of dopant nonmetal to titanium is from 2% to 20%, and at least 10% of the doped titanium oxide is in the rutile phase. The method also can provide a doped tin oxide, where the atomic ratio of dopant nonmetal to tin is from 2% to 20%, and at least 50% of 900 the doped tin oxide is in the rutile phase.

12 Claims, 5 Drawing Sheets

(51) Int. Cl.
  *B01J 21/06* (2006.01)
  *B01J 27/24* (2006.01)
  *B01J 37/02* (2006.01)
  *B01J 37/08* (2006.01)
  *B01J 37/34* (2006.01)

(52) U.S. Cl.
  CPC ............... *B01J 37/08* (2013.01); *B01J 37/346* (2013.01); *C01G 23/047* (2013.01); *C01P 2002/52* (2013.01); *C01P 2002/72* (2013.01)

(56) References Cited

U.S. PATENT DOCUMENTS

| | | | |
|---|---|---|---|
| 5,904,770 | A | 5/1999 | Ohtani et al. |
| 5,935,320 | A | 8/1999 | Graef et al. |
| 6,037,289 | A * | 3/2000 | Chopin et al. .................... 502/2 |
| 6,077,343 | A | 6/2000 | Iida et al. |
| 6,103,363 | A | 8/2000 | Boire et al. |
| 6,162,708 | A | 12/2000 | Tamatsuka et al. |
| 6,261,361 | B1 | 7/2001 | Iida et al. |
| 7,014,704 | B2 | 3/2006 | Ono et al. |
| 7,048,796 | B2 | 5/2006 | Watanabe et al. |
| 7,083,676 | B2 | 8/2006 | Chang |
| 7,147,711 | B2 | 12/2006 | Tamatsuka et al. |
| 7,182,809 | B2 | 2/2007 | Haga et al. |
| 7,208,043 | B2 | 4/2007 | Tachikawa et al. |
| 7,214,631 | B2 | 5/2007 | Wang et al. |
| 7,294,404 | B2 | 11/2007 | Krisko et al. |
| 7,354,624 | B2 | 4/2008 | Millero et al. |
| 7,354,650 | B2 | 4/2008 | Nakajima et al. |
| 7,404,856 | B2 | 7/2008 | Haga et al. |
| 7,527,982 | B1 * | 5/2009 | Arisumi ........................... 438/3 |
| 2002/0072191 | A1 | 6/2002 | Aoki et al. |
| 2002/0169076 | A1 * | 11/2002 | Takeshi et al. ................ 502/350 |
| 2003/0216252 | A1 * | 11/2003 | Gole ............................. 502/200 |
| 2006/0088986 | A1 | 4/2006 | Lin et al. |
| 2007/0190765 | A1 | 8/2007 | Xie et al. |
| 2008/0073573 | A1 | 3/2008 | Takami et al. |

OTHER PUBLICATIONS

Mohamed et al, "Effect of heat treatment on structural, optical and mechanical properties of sputtered TiOxN films," Thin Solid Films 468 (2004) 48-56.*

Ma et al, "Electrical and optical properties of F-doped textured SnO2 films deposited by APCVD" Solar Energy Materials and Solar Cells 40 (1996) 371-380.*

Herman, D. et al., "Magnetron sputtering of $TiO_xN_y$ films", Vacuum, vol. 81, pp. 285-290, (2006).

Mohamed, S.H. et al., "Effect of heat treatment on structural, optical and mechanical properties of sputtered $TiO_xN_y$ films", Thin Solid Films, vol. 468, pp. 48-56, (2004).

Wong, M-S. et al., "Reactively sputtered N-doped titanium oxide films as visible-light photocatalyst", Thin Solid Films, vol. 494, pp. 244-249, (2006).

Asahi, R. et al., "Visible-light photocatalysis in nitrogen-doped titanium oxides", Science, vol. 293, pp. 269-271, (2001).

International Search Report dated Mar. 19, 2010 for PCT application No. PCT/US09/043689.

Fu, H. et al., "Electron spin resonance spin-trapping detection of radical intermediates in N-doped TiO2-assisted photodegradation of 4-chlorophenol", Journal of Physical Chemistry B, vol. 110, No. 7, pp. 3061-3065, (2006).

Bak, T. et al., "Photo-electrochemical hydrogen generation from water using solar energy. Materials-related aspects", International Journal of Hydrogen Energy, vol. 27, issue 10, pp. 991-1022, (2002).

Deb, S.K., "Dye-sensitized TiO2 thin-film solar cell research at the national renewable energy laboratory (NREL)", Solar Energy Materials and Solar Cells, vol. 88, issue 1, pp. 1-10, (2005).

Hashimoto, K. et al., "$TiO_2$ photocatalysis: A historical overview and future prospects", Japanese Journal of Applied Physics, vol. 44, No. 12, pp. 8269-8285, (2005).

Invitation to pay additional fees and partial International Search Report dated Oct. 19, 2009 for PCT application No. PCT/US09/043689.

Li, Q. et al., "Heavily nitrogen-doped dual-phase titanium oxide thin films by reactive sputtering and rapid thermal annealing", Journal of the American Ceramic Society, vol. 91, issue 10, pp. 3167-3172, (2008).

Sameshima, T. et al., "Mechanism of pulsed laser-induced amorphization of silicon films", Applied Physics Letters, vol. 59, issue 21, pp. 2724-2726, (1991).

International Search Report dated Oct. 14, 2010 for PCT application No. PCT/US10/024540.

National University of Singapore, "Development of novel semiconductor oxide gas sensors", National University of Singapore, www.cpec.nus.edu.sg/myweb/newsletter/news4/development.html, PAO Enterprise, (1998).

* cited by examiner

HEAVILY DOPED METAL OXIDES AND METHODS FOR MAKING THE SAME

CROSS REFERENCE TO RELATED APPLICATION

This application claims priority to provisional application No. 61/057,050 entitled "HEAVILY DOPED METAL OXIDES AND METHODS FOR MAKING THE SAME" filed 29 May 2008, the entire contents of which are hereby incorporated by reference, except where inconsistent with the present application.

FEDERALLY SPONSORED RESEARCH OR DEVELOPMENT

The subject matter of this application may have been funded in part under a research grant from the National Science Foundation, under Center of Advanced Materials for the Purification of Water with Systems Grant Number CTS-0120978. The U.S. Government may have rights in this invention.

BACKGROUND

Metal oxide materials are used for a variety of applications, including catalysis, coatings, sensors, electronics, and semiconductor devices. The physical and chemical properties of metal oxides can be modified by adding one or more other elements to the metal and the oxygen in the material. These added elements are referred to as dopants, and the resulting material is referred to as a doped metal oxide.

In one example, tin oxide (empirical formula $SnO_2$) is present in a variety of commercial products. Sensors for gases such as oxygen, hydrocarbons or carbon monoxide may include tin oxide on a solid support. Sensors containing tin oxide typically are heated to 400° C. to enable the sensing function. Heavy doping of the tin oxide may increase its carrier concentration, allowing it to be used for sensing at lower temperatures. Indium tin oxide (ITO), which includes tin oxide as a dopant in the indium oxide, is widely used as a transparent electrical conductor for applications in displays, electro-optic sensors, and light emitting diodes (LEDs). Doping of tin oxide may provide an alternative to ITO, which faces future supply problems due to the scarcity of indium.

In another example, titanium oxide (empirical formula $TiO_2$) has been extensively studied as an efficient photocatalyst under ultraviolet (UV) light. Photocatalysts provide for catalysis of chemical reactions when irradiated by electromagnetic radiation, and have been investigated for applications in a variety of areas, including environmental remediation. Stable catalysts that promote oxidation reactions can break down pollutants in air and/or in water into substances that are less harmful. Anionic doping of titanium oxide can produce a red-shift in the light absorbance of the metal oxide. This can lead to photocatalysis under visible-light irradiation, allowing a greater portion of the solar spectrum to be used for catalytic activity. Among various anion-doped titanium oxides, nitrogen-doped titanium oxide (empirical formula $TiO_{2-x}N_x$) has been explored extensively, due to the ease with which it can be formed.

The chemical and/or physical properties of a metal oxide can be affected by the physical form of the metal oxide. Some metal oxides, such as tin oxide, are amorphous until heated above a transition temperature. Other metal oxides have more than one possible crystal structure, where each crystal structure tends to form at a different temperature range. Some of these metal oxides, such as titanium oxide, have more desirable physical and/or chemical properties when at least a portion of the metal oxide is in a high temperature crystal structure than when the high temperature crystal structure is absent.

In the example of titanium oxide, the anatase crystal phase is stable at low temperatures, and the rutile crystal phase is stable at high temperatures. Heating titanium oxide above the transition temperature of 700° C. can transform some or all of the anatase phase crystals into rutile phase crystals. Titanium oxide that includes a mixture of the anatase and rutile phases has photocatalytic properties that are superior to titanium oxide that is either pure anatase or pure rutile. The commercially available P25 titanium oxide powder (DEGUSSA) is an example of this dual-phase crystal titanium oxide.

It has been difficult, however, to combine the advantages of doping of metal oxides with the advantages associated with desirable crystal structures. This difficulty is due at least in part to the distinct processing requirements for each of these properties, which are typically mutually exclusive. Anion dopants in a metal oxide tend to become unstable at high temperatures. Thus, doped metal oxides that are exposed to high temperatures typically lose a large proportion of their dopants. In contrast, desirable crystal structures can only be obtained at high temperatures. Thus, the temperatures at which metal oxides are doped typically cause the formation of lower temperature crystal structures or amorphous materials.

In the example of titanium oxide, dual-phase titanium oxide typically contains little or no nitrogen dopant. Attempts to introduce a nitrogen dopant have so far achieved only a 2% doping concentration (Fu, H. et al., *J. Phys. Chem. B*, 110 (7), pp. 3061-3065 (2006)). Surface nitriding treatment of other solids, such as iron, is believed to yield a significant nitrogen concentration gradient from the surface to the interior, and nitride phases often form on the surface. Since the nitride of titanium is an electronic conductor, it produces no photocatalytic effect, and its presence on the catalyst surface is to be avoided. In contrast, typical nitrogen doping of titanium oxide is carried out at 400-500° C., and this low crystallization temperature encourages the formation of the anatase phase. Accordingly, most research on nitrogen-doped titanium oxide has been done with the anatase phase material.

It is desirable to provide doped metal oxides that include desirable crystal phases, while also including acceptable levels of dopants. It would be desirable to form such a doped metal oxide using methods that are relatively inexpensive and straightforward. Ideally, the doped metal oxides would be useful for applications such as photocatalysis and gas sensing.

SUMMARY

In one aspect, the invention provides a method of making a doped metal oxide including heating a first doped metal oxide by rapid thermal annealing, to form a second doped metal oxide. The crystal structure of the second doped metal oxide is different from the crystal structure of the first doped metal oxide.

In another aspect, the invention provides a doped titanium oxide including titanium, oxygen, and a dopant nonmetal. The atomic ratio of dopant nonmetal to titanium is from 2% to 20%, and at least 10% of the doped titanium oxide is in the rutile phase.

In yet another aspect, the invention provides a catalytic composition including the doped titanium oxide.

In yet another aspect, the invention provides a self-cleaning surface including a coating on a substrate, where the coating includes the catalytic composition including the doped titanium oxide. When acetone is in contact with the coating and is irradiated with visible light, the concentration of acetone is reduced by 30% within 30 minutes.

In yet another aspect, the invention provides a doped tin oxide including tin, oxygen, and a dopant nonmetal. The atomic ratio of dopant nonmetal to tin is from 2% to 20%, and at least 50% of the doped tin oxide is in the rutile phase.

In yet another aspect, the invention provides a catalytic composition including the doped tin oxide.

In yet another aspect, the invention provides a gas sensor including the doped tin oxide.

The following definitions are included to provide a clear and consistent understanding of the specification and claims.

The term "dopant nonmetal" means a nonmetal element that is not oxygen; for example boron, carbon, nitrogen, fluorine, silicon, phosphorus, sulfur, chlorine, germanium, arsenic, selenium, bromine, antimony, tellurium, iodine or astatine.

The term "dopant nonmetal source" means a substance containing a nonmetal element that is not oxygen, and optionally containing other elements. For example, a dopant nonmetal source may contain boron, carbon, nitrogen, fluorine, silicon, phosphorus, sulfur, chlorine, germanium, arsenic, selenium, bromine, antimony, tellurium, iodine and/or astatine.

The term "corresponding undoped metal oxide" means a metal oxide having an empirical formula similar to that of a doped metal oxide, but where the dopant is replaced with oxygen. For example, for a nitrogen-doped titanium oxide having an empirical formula of $TiO_{2-x}N_x$, the corresponding undoped metal oxide has an empirical formula of $TiO_2$.

The term "photocatalysis" means a catalysis that is dependent on the presence of electromagnetic radiation to catalyze a reaction.

The term "visible light" means electromagnetic radiation having a wavelength of 380 nm to 780 nm.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention is based on the discovery that rapid thermal annealing can change the crystal form of a doped metal oxide, while maintaining a desirably high concentration of the dopant in the doped metal oxide. The doped metal oxide may be formed by reactive sputtering. Doped metal oxides formed using rapid thermal annealing can have acceptable dopant concentrations, in combination with desirable crystal structures, such as high temperature crystal structures.

A method of making a doped metal oxide includes heating a first doped metal oxide by rapid thermal annealing, to form a second doped metal oxide. The crystal structure of the second doped metal oxide is different from the crystal structure of the first doped metal oxide. The method may further include forming the first doped metal oxide by reactive sputtering.

The first doped metal oxide includes a metal, oxygen, and a dopant element. The first doped metal oxide may be characterized in terms of its elemental composition. The atomic ratio of metal to oxygen to dopant may be 1:0.5-1.99:0.01-1.5. Preferably the atomic ratio of metal to oxygen to dopant is 1:1.0-1.98:0.02-1.0; more preferably is 1:1.5-1.95:0.05-0.5, and more preferably is 1:1.8-1.9:0.1-0.2. Preferably the metal is titanium, indium, tin or zinc.

The first doped metal oxide preferably includes a metal, oxygen, and a dopant nonmetal. Preferably the dopant nonmetal is boron, carbon, nitrogen, fluorine, silicon, phosphorus, sulfur, chlorine, germanium, arsenic, selenium, bromine, antimony, tellurium, iodine or astatine. More preferably the dopant nonmetal is boron, carbon, nitrogen, fluorine or chlorine. More preferably the dopant nonmetal is nitrogen. The atomic ratio of metal to oxygen to dopant nonmetal may be 1:0.5-1.99:0.01-1.5. Preferably the atomic ratio of metal to oxygen to dopant nonmetal is 1:1.0-1.98:0.02-1.0; more preferably is 1:1.5-1.95:0.05-0.5, and more preferably is 1:1.8-1.9:0.1-0.2.

The first doped metal oxide may include one type of dopant element, or it may include two or more types of dopant elements. For example, the first doped metal oxide may include a dopant nonmetal and a dopant metal. Examples of metal oxides that include two or more types of dopants include quaternary titanium oxides, such as titanium oxide doped with nitrogen and a transition metal, such as palladium silver, yttrium, platinum, strontium, tungsten, copper, neodymium, nickel, cobalt or vanadium. Quaternary titanium oxides are described, for example, in U.S. Patent Application Publication No. 2007/0190765 A1 to Rong-Cai Xie et al. Preferably, if a dopant metal is present, its concentration in the first doped metal oxide is at most 10 percent by weight (wt %). More preferably the concentration of dopant metal is at most 5 wt %, and more preferably is at most 2 wt %.

A corresponding undoped metal oxide of the first doped metal oxide may form a high temperature crystal phase and a low temperature crystal phase. Preferably less than 5% of the first doped metal oxide is in the high temperature crystal phase. More preferably less than 2% of the first doped metal oxide is in the high temperature crystal phase, more preferably less than 1% of the first doped metal oxide is in the high temperature crystal phase, and more preferably less than 0.5% of the first doped metal oxide is in the high temperature crystal phase.

In one example, the first doped metal oxide is a nitrogen-doped titanium oxide having an empirical formula of $TiO_{2-x}N_x$. In this example, the atomic ratio of titanium to oxygen to nitrogen may be 1:0.5-1.99:0.01-1.5. Preferably the atomic ratio of titanium to oxygen to nitrogen is 1:1.0-1.98:0.02-1.0; more preferably is 1:1.5-1.95:0.05-0.5, and more preferably is 1:1.8-1.9:0.1-0.2. These atomic ratios correspond to nitrogen to titanium atomic ratios (N:Ti) of 1-150%, 2-100%, 5-50% and 10-20%, respectively. In this example, the first doped metal oxide includes only the low temperature anatase crystal phase, and includes none of the high temperature rutile crystal phase.

A corresponding undoped metal oxide of the first doped metal oxide may form an amorphous structure at lower temperatures, and may form a crystal phase at higher temperatures. Preferably less than 5% of the first doped metal oxide is in the crystal phase. More preferably less than 2% of the first doped metal oxide is in the crystal phase, more preferably less than 1% of the first doped metal oxide is in the crystal phase, and more preferably less than 0.5% of the first doped metal oxide is in the crystal phase.

In one example, the first doped metal oxide is a nitrogen-doped tin oxide having an empirical formula of $SnO_{2-x}N_x$. In this example, the atomic ratio of tin to oxygen to nitrogen may be 1:0.5-1.99:0.01-1.5. Preferably the atomic ratio of tin to oxygen to nitrogen is 1:1.0-1.98:0.02-1.0; more preferably is 1:1.5-1.95:0.05-0.5, and more preferably is 1:1.8-1.9:0.1-0.2. These atomic ratios correspond to nitrogen to tin atomic ratios (N:Sn) of 1-150%, 2-100%, 5-50% and 10-20%, respectively. In this example, the first doped metal oxide is amorphous, and includes none of the rutile crystal phase.

The first doped metal oxide may be formed by reactive sputtering. The reactive sputtering may include sputtering a target that includes the metal or an oxide of the metal in an atmosphere that includes a dopant nonmetal source. The atmosphere may further include one or more other gases, such as oxygen or argon. Reactive sputtering can provide for incorporation of a high concentration of dopant nonmetal in the doped metal oxide. The reactive sputtering may be performed at temperatures below those typically used for forming coatings by sputtering. Preferably the reactive sputtering is performed at a temperature of at most 200° C., more preferably of at most 100° C., more preferably of at most 50° C., and more preferably of at most 30° C. Preferably the reactive sputtering is performed at room temperature. The atomic ratio of metal to oxygen to dopant nonmetal in the first doped metal oxide may be controlled by adjusting a variety of process conditions, including the chemical composition and concentration of the dopant nonmetal source in the deposition atmosphere, and the chemical composition of the target.

In one example, formation of the first doped metal oxide may include forming a nitrogen-doped titanium oxide by sputtering a titanium target or a titanium oxide target, in an atmosphere containing $N_2$, at room temperature. The atmosphere may also include $O_2$. A thin film having an empirical formula of $TiO_{2-x}N_x$ may be formed on a substrate by this process. The atomic ratio of titanium to oxygen to nitrogen in the first doped metal oxide may be controlled by adjusting a variety of process conditions, including the ratio of $N_2$ to $O_2$ in the deposition atmosphere, and the chemical composition of the target.

In another example, formation of the first doped metal oxide may include forming a nitrogen-doped tin oxide by sputtering a tin target or a tin oxide target, in an atmosphere containing $N_2$, at room temperature. The atmosphere may also include $O_2$. A thin film having an empirical formula of $SnO_{2-x}N_x$ may be formed on a substrate by this process. The atomic ratio of tin to oxygen to nitrogen may be controlled by adjusting a variety of process conditions, including the ratio of $N_2$ to $O_2$ in the deposition atmosphere, and the chemical composition of the target.

The heating a first doped metal oxide by rapid thermal annealing may include maintaining the doped metal oxide at a temperature of from 500° C. to 1,500° C. for a time of from 1 minute to 10 minutes. Preferably the heating comprises raising the temperature of the first doped metal oxide to a temperature of from 500° C. to 1,500° C. at a heating rate of from 5 to 50° C. per second (° C./sec), maintaining the doped metal oxide at a temperature of from 500° C. to 1,500° C. for a time of from 1 minute to 10 minutes, and cooling the resulting second doped metal oxide to a temperature of less than 100° C. within a time of less than 10 minutes. The chemical composition of the second doped metal oxide can be controlled by adjusting a variety of process conditions, including the composition of the annealing atmosphere, the temperatures and heating/cooling rates used, and the chemical composition of the first doped metal oxide.

Preferably the heating includes raising the temperature of the first doped metal oxide to a temperature of from 700° C. to 1,200° C., and more preferably of from 800° C. to 1,000° C. Preferably the heating includes raising the temperature of the first doped metal oxide to one of these temperature ranges at a heating rate of from 7 to 25° C./sec, and more preferably of from 10 to 15° C./sec. More preferably the heating includes maintaining the doped metal oxide at a temperature of from 700° C. to 1,200° C., and more preferably of from 800° C. to 1,000° C. Preferably the heating includes maintaining the doped metal oxide within one of these temperature ranges for a time of from 3 to 7 minutes, and more preferably of from 4 to 6 minutes. Preferably the heating includes cooling the second doped metal oxide to a temperature of less than 50° C., more preferably to a temperature of less than 30° C., and more preferably to room temperature. Preferably the heating includes cooling the second doped metal oxide to one of these temperatures within a time of less than 7 minutes, and more preferably within a time of less than 5 minutes.

In one example, heating a first doped metal oxide by rapid thermal annealing may include heating a nitrogen-doped titanium oxide to a temperature of 500° C., 700° C. or 900° C. at a heating rate of 10-15° C./sec, maintaining the nitrogen-doped titanium oxide at the temperature for 5 minutes, and then cooling the nitrogen-doped titanium oxide to room temperature within 5 minutes. In another example, heating a first doped metal oxide by rapid thermal annealing may include heating a nitrogen-doped tin oxide to a temperature of 500° C. at a heating rate of 10-15° C./sec, maintaining the nitrogen-doped tin oxide at the temperature for 5 minutes, and then cooling the nitrogen-doped tin oxide to room temperature within 5 minutes.

The second doped metal oxide includes the metal, oxygen, and the dopant element that were present in the first doped metal oxide, although the ratios of these elements may be different. The second doped metal oxide may include one type of dopant element, or it may include two or more types of dopant elements, as described for the first doped metal oxide.

The atomic ratio of metal to oxygen to dopant may be 1:0.5-1.99:0.01-1.5. Preferably the atomic ratio of metal to oxygen to dopant is 1:1.0-1.98:0.02-1.0; more preferably is 1:1.88-1.98:0.02-0.12, and more preferably is 1:1.9-1.97:0.03-0.10. Preferably the amount of dopant in the second doped metal oxide is at least 5% of the amount of dopant in the first doped metal oxide. More preferably the amount of dopant in the second doped metal oxide is at least 10% of the amount of dopant in the first doped metal oxide, more preferably is at least 20% of the amount of dopant in the first doped metal oxide, more preferably is at least 30% of the amount of dopant in the first doped metal oxide, more preferably is at least 50% of the amount of dopant in the first doped metal oxide, more preferably is at least 75% of the amount of dopant in the first doped metal oxide, and more preferably is at least 85% of the amount of dopant in the first doped metal oxide.

The second doped metal oxide preferably includes the metal, oxygen, and the dopant nonmetal that were present in the first doped metal oxide. Preferably the dopant nonmetal is boron, carbon, nitrogen, fluorine, silicon, phosphorus, sulfur, chlorine, germanium, arsenic, selenium, bromine, antimony, tellurium, iodine or astatine. More preferably the dopant nonmetal is boron, carbon, nitrogen, fluorine or chlorine. More preferably the dopant nonmetal is nitrogen. The atomic ratio of metal to oxygen to dopant nonmetal may be 1:0.5-1.99: 0.01-1.5. Preferably the atomic ratio of metal to oxygen to dopant nonmetal is 1:1.0-1.98:0.02-1.0; more preferably is 1:1.88-1.98:0.02-0.12, and more preferably is 1:1.9-1.97: 0.03-0.10.

For a second doped metal oxide having a corresponding undoped metal oxide that may form a high temperature crystal phase and a low temperature crystal phase, preferably at least 10% of the second doped metal oxide is in the high temperature crystal phase. More preferably at least 10% of the second doped metal oxide is in the high temperature crystal phase, more preferably at least 15% of the second doped metal oxide is in the high temperature crystal phase, more preferably at least 30% of the second doped metal oxide is in the high temperature crystal phase, and more preferably at least 50% of the second doped metal oxide is in the high temperature crystal phase. Preferably less than 1% of the first doped metal oxide is in the high temperature crystal phase, and at least 50% of the second doped metal oxide is in the high temperature crystal phase.

For a second doped metal oxide having a corresponding undoped metal oxide that may form an amorphous structure at lower temperatures and that may form a crystal phase at higher temperatures, preferably at least 50% of the second doped metal oxide is in the crystal phase. More preferably at least 70% of the second doped metal oxide is in the crystal phase, more preferably at least 80% of the second doped metal oxide is in the crystal phase, and more preferably at least 90% of the second doped metal oxide is in the crystal phase. Preferably less than 1% of the first doped metal oxide is in the crystal phase, and at least 90% of the second doped metal oxide is in the crystal phase.

In one example, the second doped metal oxide is a nitrogen-doped titanium oxide having an empirical formula of $TiO_{2-x}N_x$, where the atomic ratio of titanium to oxygen to nitrogen may be 1:1.8-1.98:0.02-0.2. Preferably the atomic ratio of titanium to oxygen to nitrogen is 1:1.88-1.98:0.02-0.12, and more preferably is 1:1.9-1.97:0.03-0.10. These atomic ratios correspond to nitrogen to titanium atomic ratios (N:Ti) of 2-20%, 2-12% and 3-10%, respectively. In this example, at least 10% of the second doped metal oxide is in the high temperature rutile phase, and at least 15% or at least 50% of the second doped metal oxide may be in the high temperature rutile phase. Preferably from 25% to 75% of the second doped metal oxide is in the rutile phase. More preferably from 40% to 60% of the second doped metal oxide is in the rutile phase.

In another example, the second doped metal oxide is a nitrogen-doped tin oxide having an empirical formula of $SnO_{2-x}N_x$, where the atomic ratio of tin to oxygen to nitrogen may be 1:1.8-1.98:0.02-0.2. Preferably the atomic ratio of tin to oxygen to nitrogen is 1:1.88-1.98:0.02-0.12, and more preferably is 1:1.9-1.97:0.03-0.10. These atomic ratios correspond to nitrogen to tin atomic ratios (N:Sn) of 2-20%, 2-12% and 3-10%, respectively. In this example, at least 50% of the second doped metal oxide is in the rutile crystal phase, and at least 70% or at least 90% of the second doped metal oxide may be in the rutile crystal phase.

A doped titanium oxide, such as a doped titanium oxide formed by the above method, may include titanium, oxygen and a dopant nonmetal, where the atomic ratio of dopant nonmetal to titanium (dopant:Ti) is from 2% to 20%, and at least 10% of the doped titanium oxide is in the rutile phase. Preferably the atomic ratio of dopant nonmetal to titanium is from 2% to 12%, and more preferably is from 3% to 10%. Preferably from 25% to 75% of the doped titanium oxide is in the rutile phase, and more preferably from 40% to 60% of the doped titanium oxide is in the rutile phase.

Preferably the dopant nonmetal is boron, carbon, nitrogen, fluorine, silicon, phosphorus, sulfur, chlorine, germanium, arsenic, selenium, bromine, antimony, tellurium, iodine or astatine. More preferably the dopant nonmetal is boron, carbon, nitrogen, fluorine or chlorine. More preferably the dopant nonmetal is nitrogen. Preferably the doped titanium oxide is a nitrogen-doped titanium oxide having an empirical formula of $TiO_{2-x}N_x$, where the atomic ratio of nitrogen to titanium (N:Ti) is from 2% to 20%, and at least 10% of the nitrogen-doped titanium oxide is in the rutile phase. Preferably the atomic ratio of nitrogen to titanium is from 2% to 12%, and more preferably is from 3% to 10%.

The band gap of the doped titanium oxide may be characterized by spectroscopic analysis. The energy of absorbed radiation having the longest wavelength corresponds to the band gap energy. Preferably the doped titanium oxide has a band gap less than 2.9 electron-volts (eV). More preferably the doped titanium oxide has a band gap less than 2.8 eV, more preferably less than 2.7 eV, and more preferably less than 2.6 eV.

The doped titanium oxide having an atomic ratio of dopant nonmetal to titanium of from 2% to 20%, and in which at least 10% of the doped titanium oxide is in the rutile phase, can be used in a variety of applications. Examples of possible applications include catalysis, water and air purification, gas sensing, hydrogen production, and solar energy production. In general, any application that can utilize titanium oxide, titanium oxide doped with a metal, and/or titanium oxide doped with a nonmetal may also utilize the doped titanium oxide having an atomic ratio of dopant nonmetal to titanium of from 2% to 20%, and in which at least 10% of the doped titanium oxide is in the rutile phase. One advantage of this doped titanium oxide over the conventional materials is its high catalytic efficiency under visible light rather than UV light. Thus, applications of the conventional materials that require UV irradiation may be performed under visible light using this doped titanium oxide.

A catalytic composition may include a doped titanium oxide having an atomic ratio of dopant nonmetal to titanium of from 2% to 20%, and in which at least 10% of the doped titanium oxide is in the rutile phase. The catalytic composition may be characterized by the rate of conversion of a chemical reaction when the reactants are in contact with the composition. When acetone is in contact with the composition and is irradiated with visible light, the concentration of acetone may be reduced by 30% within 30 minutes.

The catalytic composition including the doped titanium oxide may be present on a support. Examples of support materials include glass, ceramic, metal, plastic and paper. The support may be porous or non-porous. Examples of porous supports include a mat of fibers, a zeolite, or a porous film. The term "on a support" includes when the composition is on at least a portion of a surface of the support. For porous supports, the term "on a support" further includes when the composition is present within the pores of the support. The catalytic composition may be present without a support. For example, the catalytic composition may be in the form of a powder, beads, fibers, a porous material, or nanoparticles. The catalytic composition also may be present in one or more of these forms on a support.

The catalytic composition including the doped titanium oxide may be used to facilitate a wide variety of reactions. For example, the catalytic composition may be mixed with a reactant fluid and irradiated with visible light, providing for a chemical reaction of one or more ingredients of the fluid. The catalytic composition may then be recovered from the fluid and recycled for use in another portion of reactant fluid. Depending on the application and on the dopants in the doped titanium oxide, a catalytic composition containing the doped titanium oxide may be used in place of general metal catalysts such as cobalt, nickel, copper, gold, iridium, lanthanum, nickel, osmium, platinum, palladium, rhodium, ruthenium, silver, strontium, yttrium, zirconium and tin.

In another example, the catalytic composition including the doped titanium oxide may be present on a support, and a fluid may flow in contact with the composition. In this configuration, the catalytic composition may be exposed to a constant stream of fluid and does not require separation of the composition from the fluid after the reaction is performed. For example, the catalytic composition may be present on a support in an automobile exhaust system, where the exhaust system has been fitted with a visible light source, such as a fiber optic light source or an LED light source. Irradiation of the catalytic composition during operation of the automobile engine may provide for degradation of organics and other pollutants from the engine into substances that are more environmentally acceptable.

In another example, the catalytic composition including the doped titanium oxide may be present on a surface that is exposed to dirt, grease and other organic and inorganic contaminants. Such a surface may be "self-cleaning" when exposed to visible light. A self-cleaning surface may include a coating on a substrate, where the coating includes the catalytic composition. In one example, a self-cleaning glass may have a transparent or translucent coating including the catalytic composition on one or both sides of the glass. Contaminants that contact the glass may then be degraded when the glass is exposed to visible light. It may be desirable for self-cleaning glass to have a hydrophilic surface, to provide for rinsing of any remaining degradation products from the glass with water. Examples of self-cleaning glass having surface coatings of titanium oxide include SunClean® glass (PPG Industries, Pittsburgh, Pa.) and Activ™ glass (Pilkington, Toledo, Ohio). A self-cleaning surface having a coating that includes the catalytic composition may also remove fingerprints from the surface automatically upon exposure to visible light.

In another example, the catalytic composition including the doped titanium oxide may be present on a surface that is exposed to microbes, such as bacteria and fungi, and/or to viruses. Such a surface may be a "disinfecting surface" by destroying or inactivating microbes or viruses that are present on the surface. For example, surfaces in residential, commercial or hospital environments may have a coating of the catalytic composition on the surface. Examples of surfaces that may be made into disinfecting surfaces include countertops, flooring, walls, handles, telephones, and surfaces of medical instruments.

In another example, the catalytic composition including the doped titanium oxide may be applied to a surface to provide a temporary disinfection of the surface. For example, the catalytic composition may be part of a cleaning composition in the form of a liquid, a foam or a lotion. Application of the cleaning composition to a surface, followed by exposure of the surface to visible light, may cause the destruction or inactivation of microbes or viruses that are present on the surface. Such cleaning compositions may be formulated for use on skin to provide a disinfecting personal care product.

The doped titanium oxide having an atomic ratio of dopant nonmetal to titanium of from 2% to 20%, and in which at least 10% of the doped titanium oxide is in the rutile phase, may be used for air and/or water purification. For example, the doped titanium oxide may be mixed with contaminated air or water and irradiated with visible light. Contaminants in the air or water may be degraded into substances that are volatile or that are more easily separated from the fluid. For example, contaminants containing organic substances and halogenated substances may be degraded into carbon dioxide and halide ions, which then may be separated from the air or water. In the case of air purification, the degradation of contaminants also may result in control of odors in the air. Examples of water purification systems that use titanium oxide and UV radiation include the Photo-Cat® system (Purifics® ES Inc., London, Ontario, Calif.) and the water treatment system from Matrix Photocatalytic, Inc. (London, Ontario, Calif.). Examples of air purification systems that use titanium oxide and UV radiation include the air treatment system from Matrix Photocatalytic, Inc.

The doped titanium oxide having an atomic ratio of dopant nonmetal to titanium of from 2% to 20%, and in which at least 10% of the doped titanium oxide is in the rutile phase, may be used for sensing gases. The electrical conductivity of the doped titanium oxide may vary depending on the chemical composition of its environment, and this variable conductivity may provide for the use of the doped titanium oxide to measure the identity and/or amount of one or more gases. The electrical resistance of the doped titanium oxide or a material containing the doped titanium oxide may be measured in an environment and compared with the electrical resistance in a control environment. The difference between the measured resistance and the control resistance may be correlated with the amount and/or identity of a gas in the environment. Examples of gases that may be identified and/or measured include hydrogen, carbon monoxide, hydrogen sulfide, and water. Preferably a gas sensor using the doped titanium oxide can be used to sense gases at ambient conditions.

The doped titanium oxide having an atomic ratio of dopant nonmetal to titanium of from 2% to 20%, and in which at least 10% of the doped titanium oxide is in the rutile phase, may be used for the production of hydrogen and oxygen from water. Splitting of water into hydrogen gas and oxygen gas using titanium oxide and UV radiation is described, for example, in T. Bak et al., *International Journal of Hydrogen Energy*, 27, 991-1022 (2002). Water may be decomposed into hydrogen and oxygen by photocatalysis with the doped titanium oxide, when irradiated with visible light. This decomposition also may be carried out in a photo-electrochemical cell having a photo-anode containing the doped titanium oxide. It may be desirable to use a photo-electrochemical cell, as this can provide for separate collection of hydrogen and oxygen from the cell.

The doped titanium oxide having an atomic ratio of dopant nonmetal to titanium of from 2% to 20%, and in which at least 10% of the doped titanium oxide is in the rutile phase, may be used for the production of electricity from solar radiation. Solar cells containing titanium oxide and a dye for sensitizing the titanium oxide are described, for example, in S. K. Deb, *Solar Energy Materials & Solar Cells*, 88, 1-10 (2005). Electric current may be produced when dye molecules are excited by exposure to light, transferring electrons into the conduction band of the doped titanium oxide. The doped titanium oxide may conduct the electrons to a current collector that is connected to an electrical circuit with a load.

A doped tin oxide, such as a doped tin oxide formed by the above method, may include tin, oxygen and a dopant nonmetal, where the atomic ratio of dopant nonmetal to tin (dopant:Sn) is from 2% to 20%, and at least 50% of the doped tin oxide is in the rutile phase. Preferably the atomic ratio of dopant nonmetal to tin is from 2% to 12%, and more preferably is from 3% to 10%. Preferably at least 70% of the second doped metal oxide is in the rutile crystal phase, and more preferably at least 90% of the second doped metal oxide is in the rutile crystal phase.

Preferably the dopant nonmetal is boron, carbon, nitrogen, fluorine, silicon, phosphorus, sulfur, chlorine, germanium, arsenic, selenium, bromine, antimony, tellurium, iodine or astatine. More preferably the dopant nonmetal is boron, carbon, nitrogen, fluorine or chlorine. More preferably the dopant nonmetal is nitrogen. Preferably the doped tin oxide is a nitrogen-doped tin oxide having an empirical formula of $SnO_{2-x}N_x$, where the atomic ratio of nitrogen to tin (N:Sn) is from 2% to 20%, and at least 50% of the second doped metal oxide is in the rutile crystal phase. Preferably the atomic ratio of nitrogen to tin is from 2% to 12%, and more preferably is from 3% to 10%.

The doped tin oxide having an atomic ratio of dopant nonmetal to tin of from 2% to 20%, and in which at least 50% of the doped tin oxide is in the rutile phase, can be used in a variety of applications. Examples of possible applications include catalysis and gas sensing. In general, any application that can utilize tin oxide, tin oxide doped with a metal, and/or tin oxide doped with a nonmetal may also utilize the doped tin oxide having an atomic ratio of dopant nonmetal to tin of from 2% to 20%, and in which at least 50% of the doped tin oxide is in the rutile phase. One advantage of this doped tin oxide over the conventional materials is the increased concentration of carriers in the doped tin oxide. Thus, applications of the conventional materials that require high temperatures may be performed at lower temperatures using the doped tin oxide.

A catalytic composition may include a doped tin oxide having an atomic ratio of dopant nonmetal to tin of from 2% to 20%, and in which at least 50% of the doped tin oxide is in the rutile phase. The catalytic composition may be used to facilitate a wide variety of reactions. For example, the catalytic composition may be mixed with a reactant fluid, providing for a chemical reaction of one or more ingredients of the fluid. The catalytic composition may then be recovered from the fluid and recycled for use in another portion of reactant fluid. In another example, the catalytic composition may be present on a support, and a fluid may flow in contact with the composition. In this configuration, the catalytic composition may be exposed to a constant stream of fluid and does not require separation of the composition from the fluid after the reaction is performed. The catalytic composition may be present on a support, or may be present without a support, as described above for catalytic compositions including doped titanium oxide. Depending on the application and on the dopants in the doped tin oxide, catalytic compositions containing the doped tin oxide may be used in place of general metal catalysts such as cobalt, nickel, copper, gold, iridium, lanthanum, nickel, osmium, platinum, palladium, rhodium, ruthenium, silver, strontium, yttrium, zirconium and tin.

The doped tin oxide having an atomic ratio of dopant nonmetal to tin of from 2% to 20%, and in which at least 50% of the doped tin oxide is in the rutile phase, may be used for sensing gases. The electrical conductivity of the doped tin oxide may vary depending on the chemical composition of its environment, and this variable conductivity may provide for the use of the doped tin oxide to measure the identity and/or amount of one or more gases. The electrical resistance of the doped tin oxide or a material containing the doped tin oxide may be measured in an environment and compared with the electrical resistance in a control environment. The difference between the measured resistance and the control resistance may be correlated with the amount and/or identity of a gas in the environment. Examples of gases that may be identified and/or measured include oxygen, hydrogen, carbon monoxide, hydrogen sulfide, and water. Preferably a gas sensor using the doped tin oxide can be used to sense gases at ambient conditions. In one example, a gas sensor using the doped tin oxide may be present in an automobile exhaust system, where the sensor may be used for identifying and/or quantifying one or more gases in the exhaust system.

The following examples are provided to illustrate one or more preferred embodiments of the invention. Numerous variations may be made to the following examples that lie within the scope of the invention.

EXAMPLES

Example 1

Formation of Doped and Undoped Metal Oxide Films

Reactive DC magnetron sputtering was used to deposit doped and undoped metal oxide thin films onto quartz substrates. An ATC 2000 custom four gun Co-sputtering system (AJA International, Inc.; North Scituate, Mass.) was used to form a titanium oxide film and nitrogen-doped titanium oxide films on quartz slide substrates (Chemglass Inc.; Vineland, N.J.). A titanium plate (99.9% purity, 5 cm diameter, Kurt J. Lesker Company, Pittsburgh, Pa.) was used as the target, and the deposition was performed at room temperature. The quartz slide substrate was rotated continually to produce uniform thin films. For the nitrogen-doped titanium oxide films, the sputtering took place in an atmosphere containing a mixture of $N_2$ and $O_2$, at 20 millitorr (mtorr) pressure. Two different $N_2/O_2$ ratios (7:3, and 9:1) were used to produce thin film samples with different initial nitrogen doping levels. For the undoped titanium oxide film, the sputtering took place in an $O_2$ atmosphere at 20 mtorr pressure.

Example 2

Rapid Thermal Annealing of Metal Oxide Films

A fast annealing process was used to crystallize the amorphous thin films of Example 1. This process reduced the total annealing time to approximately 10 minutes, and subsequently minimized the loss of nitrogen dopants during the crystallization and structure transition process. The films of Example 1 were treated by rapid thermal annealing using a Jipelec Jetfirst 100 Rapid Thermal Processor (Qualiflow Therm; Montpellier, France) at a heating rate of approximately 10-15° C./sec. Three different holding temperatures were investigated: 500° C., 700° C. and 900° C. The films were kept at the holding temperature for 5 minutes and then cooled down to room temperature within 5 minutes.

Example 3

Crystal Structures of Metal Oxide Films

Figure 1A:
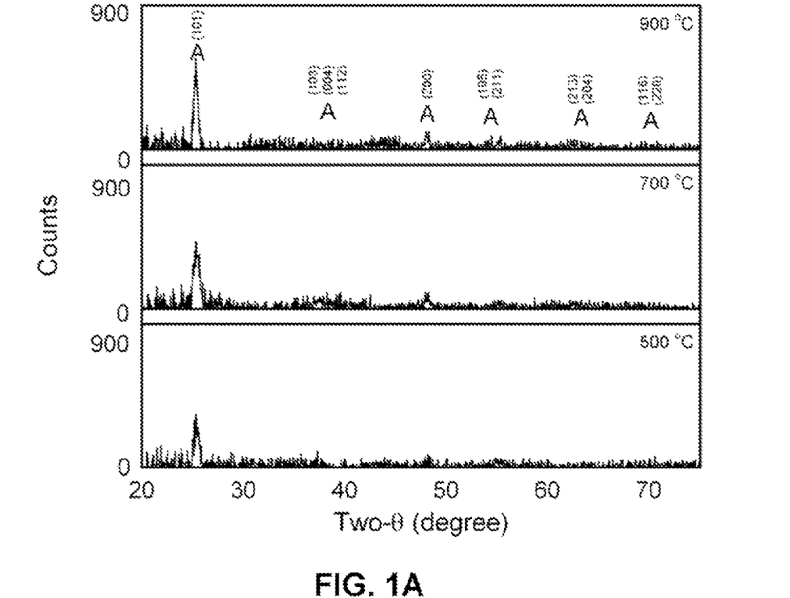
FIG. 1 is a set of X-ray diffraction (XRD) patterns of undoped (FIG. 1A) and nitrogen-doped (FIG. 1B, 1C) titanium oxide films.
Figure 1B:
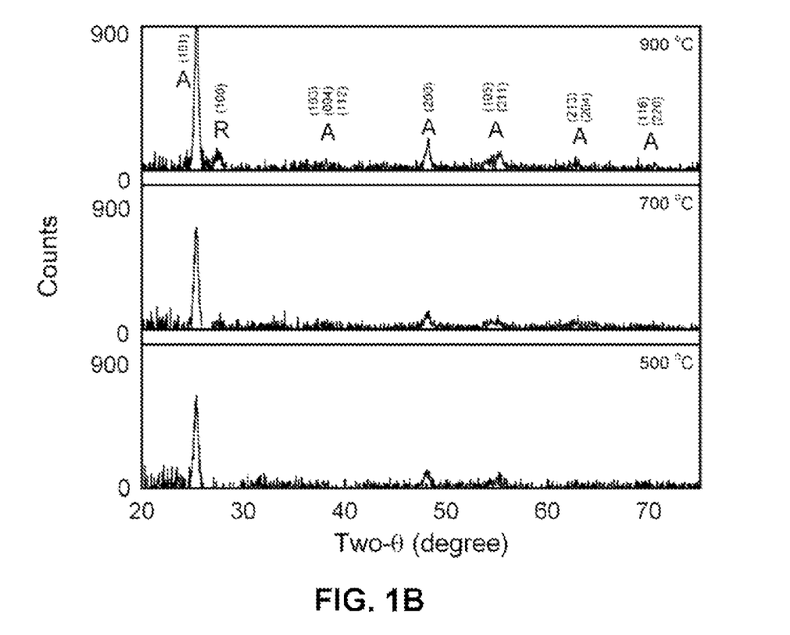
Figure 1C:
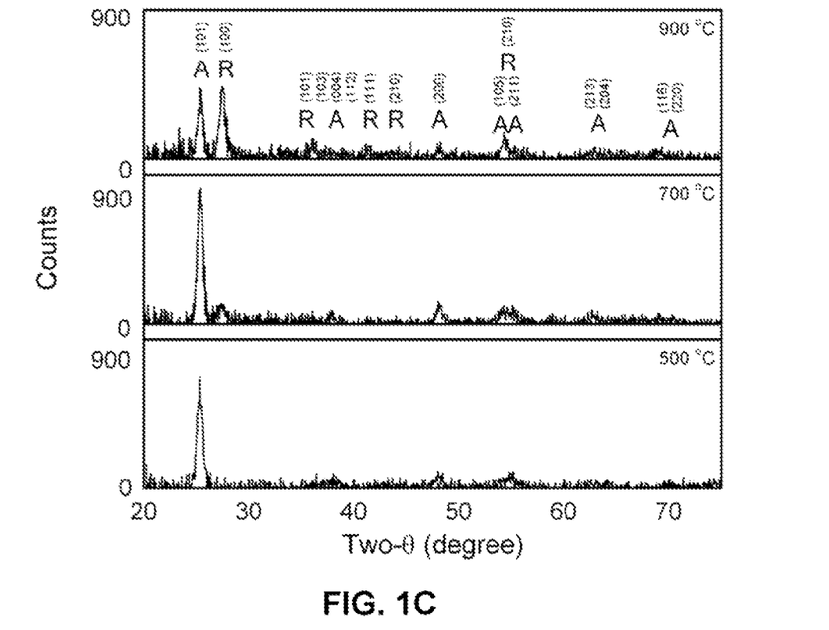

X-ray diffraction (XRD) analysis of the thin films of Example 2 was performed to examine the crystal structure of the films. XRD was carried out with a Philips X'pert diffractometer (PANalytical Inc., Tempe, Ariz., U.S.A.), using Cu (0.15418 nm) radiation at 45 kV and 40 mA. FIGS. 1A-1C depict X-ray diffraction (XRD) patterns of the films. In these figures, "A" indicates peaks related to the anatase phase, and "R" indicates peaks related to the rutile phase.

FIG. 1A depicts the XRD patterns of the titanium oxide film samples. The titanium oxide samples contained only anatase phase for all three annealing temperatures. FIG. 1B depicts the XRD patterns of the nitrogen-doped titanium oxide film samples deposited with a $N_2/O_2$ ratio of 7:3. After annealing at both 500° C. and 700° C., these samples contained mainly an anatase phase, with sharper peaks and higher reflection intensities than the corresponding undoped samples. A weak rutile (100) peak occurred after annealing these films at 900° C. FIG. 1C depicts the XRD patterns of the nitrogen-doped titanium oxide film samples deposited with a $N_2/O_2$ ratio of 9:1. For these samples, the rutile phase occurred after annealing at 700° C. or higher. When annealing at 900° C., a large portion of anatase phase was transformed to rutile phase, producing a dual-phase structure of anatase and rutile.

Table 1 summarizes the lattice constants and the concentrations of anatase phase and rutile phase in the samples. The lattice constants of the nitrogen-doped titanium oxide samples were slightly different from those of the standard titanium oxide anatase and rutile phases, indicating that nitrogen-doping deformed the lattice of titanium oxide. The nitrogen-doped titanium oxide films formed with a higher $N_2/O_2$ ratio in the deposition atmosphere had more rutile phase after rapid thermal annealing, and the amount of rutile phase in these samples increased as the holding temperature in the annealing increased. When the holding temperature was 900° C., more than half of the anatase phase was transformed to the rutile phase in the sample deposited in the mixture of $N_2/O_2$ ratio of 9:1.

TABLE 1

Crystal structure analysis of thin film samples

| $N_2:O_2$ | | 500° C. | | 700° C. | | 900° C. | |
|---|---|---|---|---|---|---|---|
| | | anatase | rutile | anatase | rutile | anatase | rutile |
| 0 | a (Å) | 3.7768 | / | 3.7787 | / | 3.7780 | / |
| | c (Å) | 9.5747 | / | 9.5720 | / | 9.6449 | / |
| | wt % | 100 | 0 | 100 | 0 | 100 | 0 |
| 7:3 | a (Å) | 3.7813 | / | 3.7834 | / | 3.7759 | 4.5897 |
| | c (Å) | 9.4695 | / | 9.3743 | / | 9.4166 | 2.9451 |
| | wt % | 100 | 0 | 100 | 0 | 88.9 | 11.1 |
| 9:1 | a (Å) | 3.7849 | / | 3.7896 | 4.5832 | 3.7937 | 4.5994 |
| | c (Å) | 9.5725 | / | 9.3331 | 2.9714 | 9.1131 | 2.8658 |
| | wt % | 100 | 0 | 81.5 | 18.5 | 41.0 | 59.0 |

These results are surprising and unexpected, since it was previously reported that a higher anionic dopant concentration caused a poor crystallization of anion-doped titanium oxide and retarded the anatase to rutile phase transition. In contrast, these results indicate that the films having a higher nitrogen dopant concentration had better crystallization and a lower anatase to rutile phase transition temperature.

One possible explanation for these results is that the rapid thermal annealing is a non-equilibrium process, which provides for relaxation of the doped matrix. Previous investigations of the crystallization of titanium oxide and nitrogen-doped titanium oxide typically were conducted on powders in an equilibrium process, in which samples were kept at high temperatures for several hours. Under these conditions, the anatase phase usually transforms to rutile phase at approximately 700° C. However, in the rapid thermal annealing process, the samples are held at high temperatures for only a short period. For the undoped titanium oxide samples, both the lack of transformation time and the physical constraint from the substrate in contact with the films appeared to have suppressed the anatase to rutile transition. Even at 900° C., the films still remained in the anatase structure. For the nitrogen-doped titanium oxide samples, the loss of nitrogen dopants during the fast annealing process is believed to have caused a relaxation of the metal oxide structure. This relaxation contributed to overcoming the constraint effect from the substrate, resulting in a greater driving force for anatase to rutile phase transformation. At a higher $N_2/O_2$ ratio in the deposition atmosphere, heavier nitrogen-doping was present in the samples, providing an increase in the driving force related to this relaxation process.

Example 4

Chemical Composition of Doped Metal Oxide Films

X-ray photoelectron spectroscopy (XPS) was used to obtain semi-quantitative data on the chemical compositions of the nitrogen-doped titanium oxide films of Example 2. XPS measurements were performed with a Physical Electronics PHI 5400 X-ray Photoelectron Spectrometer (Perkin-Elmer Corporation, Eden Prairie, Minn., U.S.A.) with an Mg K anode (1253.6 eV photon energy, 15 kV, 300 W) at a take-off angle of 45°. To remove thin film surface contaminants, 1 minute of $Ar^+$ ion sputtering was conducted before the XPS survey. Multiplex XPS spectra of N 1s, O 1s, and Ti 2p were recorded using band-pass energy of 35.75 eV, corresponding to an energy resolution of 1.2 eV. The relative element composition ratios were determined by multiplex high-resolution scans over N 1s, O 1s, and Ti 2p spectral regions, and comparing the peak areas of their spectra.

Figure 2A:
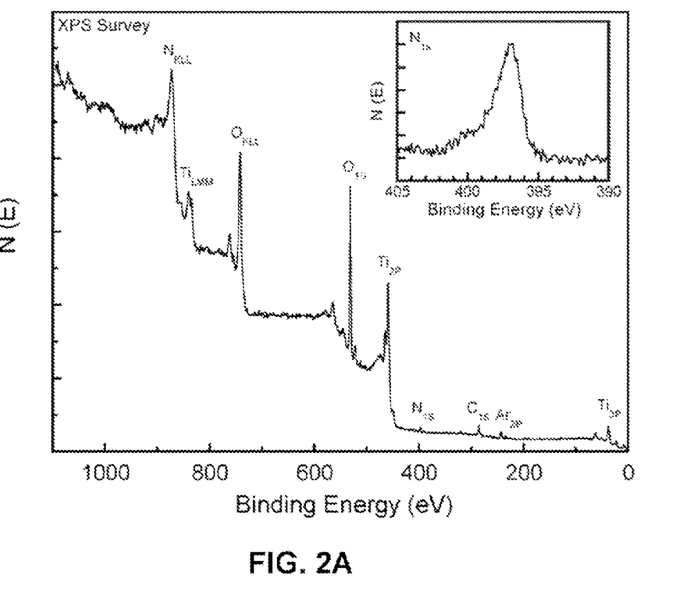
FIG. 2A is a representative XPS survey spectrum of a nitrogen-doped titanium oxide film. The inset plot is a magnified survey spectrum over the N 1s spectral region.

FIG. 2A depicts a representative XPS survey spectrum of nitrogen-doped titanium oxide thin films, and the inset plot depicts the magnified survey spectra over the N 1s spectral region. Peaks for N, O, and Ti were observed. The existence of Ar 2p peaks and the shape deformation of Ti 2p peaks likely were caused by the $Ar^+$ ion sputtering used to remove the thin film surface contaminants before conducting the XPS survey. The C 1s peak was believed to be a consequence of carbon in the environment. The binding energy of N 1s was approximately 397 eV, which was associated with Ti—N bonding, indicating a substitution of O atoms by N atoms.

Figure 2B:
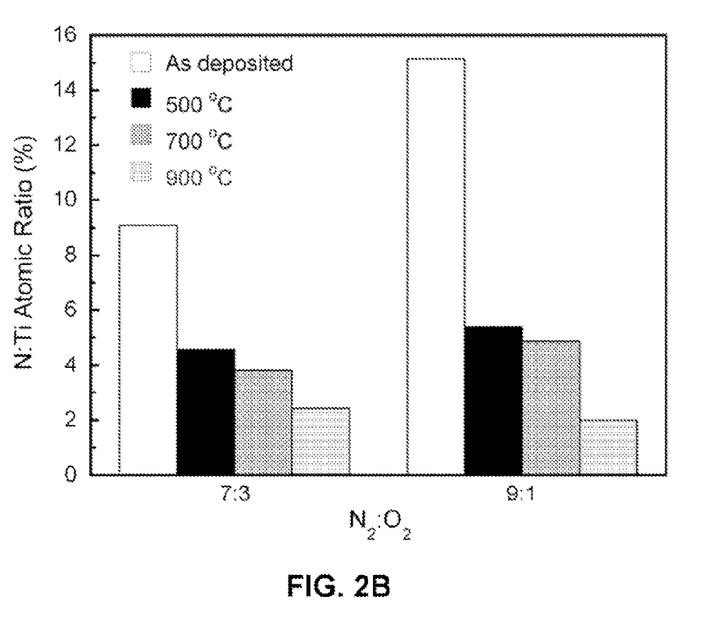
FIG. 2B depicts the N:Ti atomic ratios of nitrogen-doped titanium oxide films.

FIG. 2B depicts the nitrogen to titanium (N:Ti) atomic ratios of the nitrogen-doped metal oxide samples. The films formed with a higher $N_2/O_2$ ratio in the deposition atmosphere had higher N:Ti atomic ratios. Some nitrogen dopants were lost during the annealing process; however, there was still a relatively high nitrogen doping concentration in the annealed samples of the doped titanium oxides. For example, the sample that included 59% rutile phase ($N_2$:$O_2$ deposition atmosphere of 9:1, rapid thermal annealing at 900° C.) had a N:Ti atomic ratio of approximately 2.0%.

Example 5

Optical Properties of Doped Metal Oxide Films

Figure 3A:
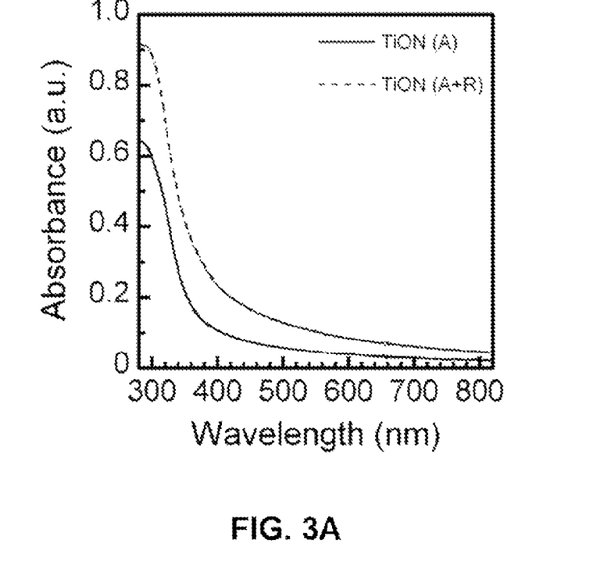
FIG. 3A is a set of UV-visible (UV-vis) absorbance spectra of (a) nitrogen-doped titanium oxide films including only anatase phase ("TiON (A)") and (b) nitrogen-doped titanium oxide films including both anatase and rutile phases ("TiON (A+R)").
Figure 3B:
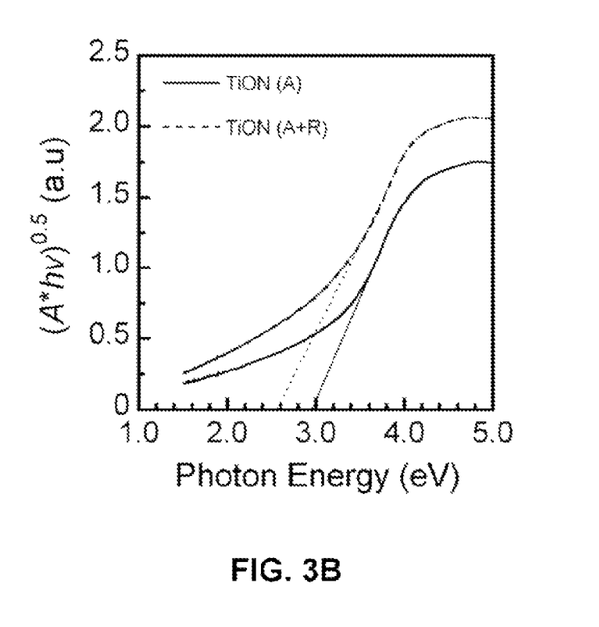
FIG. 3B is a Tauc Plot ($(A*h\nu)^{0.5}$ vs eV) constructed from FIG. 3A.

Optical absorbance spectra of the nitrogen-doped titanium oxide films of Example 2 were measured on a diode array spectrophotometer HP8452A (Hewlett Packard Corporation, Palo Alto, Calif., U.S.A.) in the transmission mode. FIG. 3A depicts the ultraviolet-visible (UV-vis) spectra of two types of films, and FIG. 3B depicts the Tauc Plot constructed from FIG. 3A. Band gap values were determined from the extrapolation of the linear Tauc Region line to the photon energy abscissa.

FIG. 3A depicts the UV-vis spectra of nitrogen-doped titanium oxide films having only anatase phase ("TiON (A)") and of nitrogen-doped titanium oxide films having both anatase and rutile phase ("TiON (A+R)"). Each film was formed in a deposition atmosphere having a $N_2$:$O_2$ ratio of 9:1. The "TiON (A)" film was annealed at 500° C., and the "TiON (A+R)" film was annealed at 900° C. The pure anatase film showed a shift into the visible light range (wavelength over 400 nm). Interestingly, although the film with the dual-phase structure of anatase and rutile had a lower concentration of nitrogen dopant than the film with the pure anatase phase, the dual-phase film had a much higher light absorbance in the entire visible light range.

FIG. 3B depicts the Tauc Plot (($A*hv$)$^{0.5}$ vs eV) constructed from FIG. 3A. The Tauc Plot was used to determine the semiconductor band gaps of the films. The band gap of the film with the pure anatase phase was approximately 2.95 eV, while the band gap of the film with the dual-phase structure of anatase and rutile was approximately 2.55 eV. One possible explanation for this decrease in the band gap for the dual-phase film is that the dual-phase film included isolated N 2p states in the band gap. Anatase titanium oxide has a band gap at approximately 3.20 eV, while rutile $TiO_2$ has a band gap at approximately 3.00 eV. Thus, it appears that the visible light absorption capability of nitrogen-doped titanium oxide depends on its crystal structure.

Example 6

Photocatalytic Effect of Doped Metal Oxide Films on Water Contact Angle

The wetting characteristics of the surfaces of the nitrogen-doped titanium oxide films of Example 2 were investigated for both a pure anatase phase film and a dual-phase film having both anatase and rutile phase. The water contact angle of each type of film was measured during illumination by visible light, using a metal halogen desk lamp having a glass filter. No radiation intensity was detected from the lamp below a wavelength of 400 nm. The light intensity striking the film samples was approximately 1.0 milliwatt per square centimeter (mW/cm$^2$), as measured by a Multi-Sense MS-100 optical Radiometer (UVP, Inc., Upland, Calif., U.S.A.).

Figure 4:
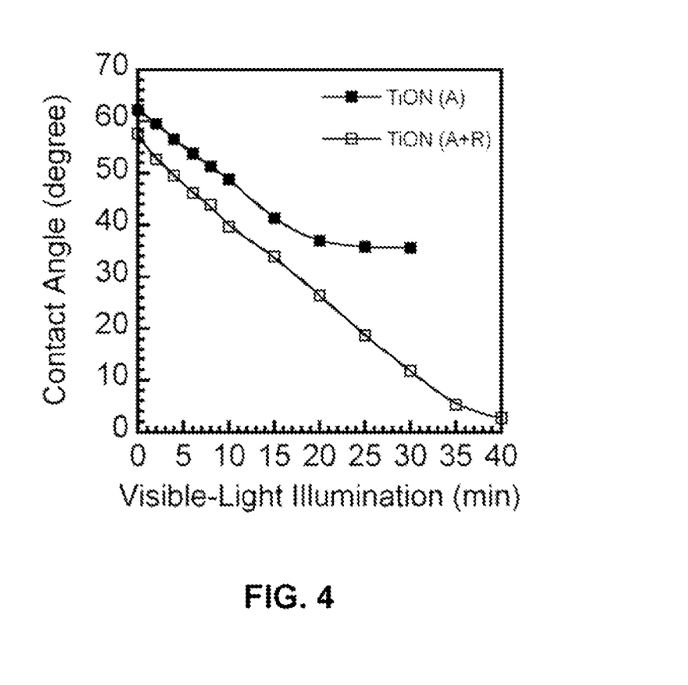
FIG. 4 is a graph of water contact angle as a function of illumination time with visible light for (a) a nitrogen-doped titanium oxide film including only anatase phase ("TiON (A)") and (b) a nitrogen-doped titanium oxide film including both anatase and rutile phases ("TiON (A+R)").

FIG. 4 is a graph of water contact angle as a function of illumination time with visible light. Prior to illumination, the pure anatase film ("TiON(A)") had a contact angle of approximately 62°, and the dual-phase film ("TiON(A+R)") had a contact angle of approximately 57°. Since the initial contact angle of titanium oxide can vary by several tens of degrees depending on the surface roughness, the similarity of initial contact angles between the samples suggested that both films had similar surface conditions.

Upon illumination with visible light, hydrophilic conversions were observed for both films. The contact angles of both surfaces decreased initially. After approximately 25 min illumination, the contact angle of the pure anatase film stopped decreasing and reached a steady value of approximately 35°. Similar observation had been reported by Hashimoto et al., and was explained by the lower photocatalytic capability of nitrogen-doped titanium oxide under visible light illumination, as compared with UV illumination (Hashimoto et al., *Jpn. J. Appl. Phys.*, 44 (12), pp. 8269-8285 (2005)). In contrast, the contact angle of the dual-phase film continued to decrease to nearly zero, indicating a complete hydrophilic conversion. Thus, the dual-phase nitrogen-doped titanium oxide had a visible light photocatalytic activity that was drastically greater than that of the pure anatase nitrogen-doped titanium oxide.

Example 7

Photocatalytic Effect of Doped Metal Oxide Films on Organic Degradation

The photocatalytic activities of the nitrogen-doped titanium oxide films of Example 2 were further investigated by degrading the organic compounds acetone and humic acid (HA), under visible light illumination. Nitrogen-doped titanium oxide films, either having a pure anatase phase or having both anatase and rutile phases, were contacted with an aqueous solution of each compound. The films were then illuminated with visible light (wavelength over 400 nm) for varying time intervals. After each interval, the light absorption of the solution was measured, and the remaining percentage of pollutants in the solution was calculated.

Acetone (>99.5%, Sigma-Aldrich; St. Louis, Mo., U.S.A.) and the sodium salt of humic acid (Acros Organics; Morris Plains, N.J., U.S.A.) were used to prepare their aqueous solutions as model organic pollutants for photocatalytic degradation. The acetone solution was 1×10$^{-3}$ molar (M) acetone. The humic acid solution contained 100 parts per million (ppm) humic acid. Nitrogen-doped titanium oxide film samples (6.25 cm$^2$), having either a pure anatase phase or a mixture of anatase and rutile phases, were placed at the bottoms of 50×15 mm petri dishes. A 10 milliliter (mL) sample of an aqueous pollutant solution was then added into the petri dish for each measurement. The covered petri dishes were illuminated by the same metal halogen desk lamp used in Example 6. The visible light illumination time varied from 5 min to 30 min for acetone, and from 1 hour to 10 hours for humic acid. The light absorption of the clear solution was measured by a Cary 500 UV/Vis/NIR spectrophotometer (Varian, Inc., Palo Alto, Calif., U.S.A.).

Figure 5A:
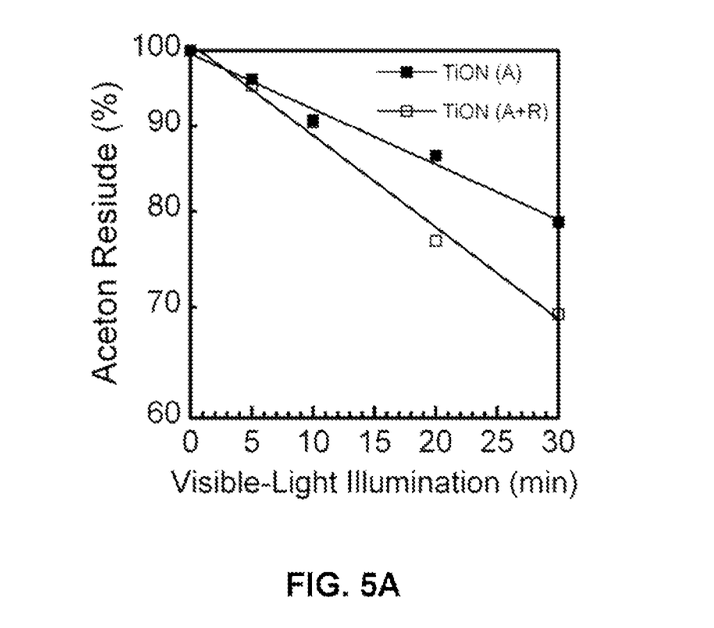
FIG. 5 is a set of graphs depicting the decrease in the percentage of acetone (FIG. 5A) or humic acid (FIG. 5B) as a function of illumination time with visible light, when solutions of acetone or humic acid were in contact with either a nitrogen-doped titanium oxide film including only anatase phase ("TiON (A)") or a nitrogen-doped titanium oxide film including both anatase and rutile phases ("TiON (A+R)").
Figure 5B:
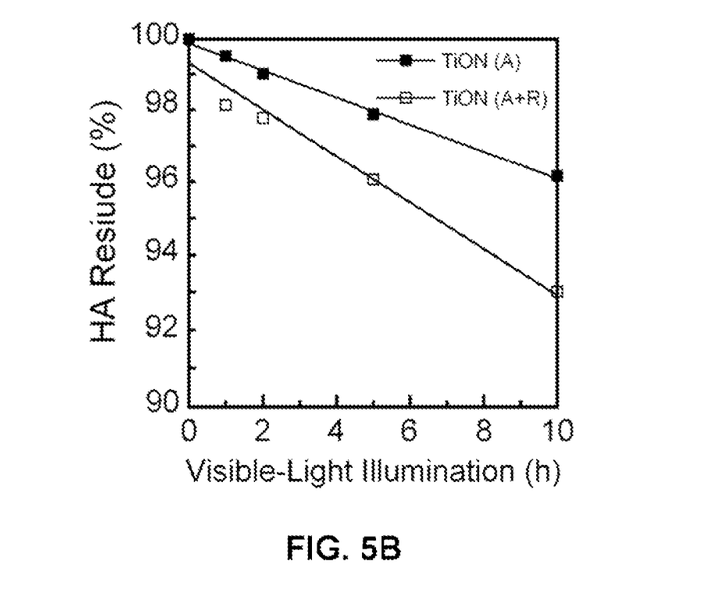

FIGS. 5A and 5B depict the residue percentage of acetone and humic acid (HA), respectively, as a function of visible-light illumination time. The results for the pure anatase film and the dual-phase film are noted as "TiON (A)" and TiON (A+R)", respectively. A first-order exponential decay was observed for both acetone and humic acid, which could be fitted into equation (1):

$$RP = ae^{-bt} \quad (1)$$

where RP is the residue percentage of either acetone or HA, t is the visible light illumination time, a and b are the first-order exponential fitting constants. Constant b, the decay rate, can be used as a parameter to compare the photodegradation efficiency of different photocatalysts.

Table 2 summaries the decay rate constant b of both acetone and humic acid solutions under visible light illumination for each of the film samples. Both compounds degraded more readily when in contact with the dual-phase film. For the acetone solution, the decay rate constant b increased from $7.694 \times 10^{-3}$ min$^{-1}$ for the pure anatase film to $1.275 \times 10^{-2}$ min$^{-1}$ for the dual-phase film. This corresponded to a 72% increase in activity. For the humic acid solution, the decay rate constant b increased from $3.869 \times 10^{-2}$ h$^{-1}$ for the pure anatase film to $6.663 \times 10^{-2}$ h$^{-1}$ for the dual-phase film. This corresponded to a 66% increase in activity. The similarity of the increases in the decay rate constant b for two distinct organic compounds suggested that the dual-phase nitrogen-doped titanium oxide could provide an improved photocatalytic capability under visible light illumination for the degradation of a broad range of organic pollutants.

TABLE 2

Decay rate constants of acetone and humic acid aqueous solutions under visible light illumination for thin film samples

|  | $b_{TiON(A)}$ | $b_{TiON(A+R)}$ | $b_{TiON(A+R)}/b_{TiON(A)}$ |
|---|---|---|---|
| Acetone | $7.694 \times 10^{-3}$ m$^{-1}$ | $1.275 \times 10^{-2}$ m$^{-1}$ | 1.72 |
| Humic acid | $3.869 \times 10^{-2}$ h$^{-1}$ | $6.663 \times 10^{-2}$ h$^{-1}$ | 1.66 |

Example 8

Formation and Rapid Thermal Annealing of Nitrogen-Doped Tin Oxide Films

Reactive DC magnetron sputtering was used to deposit nitrogen-doped tin oxide thin films onto quartz substrates. The procedure was similar to that of Example 1, except that a tin oxide plate was used as the target, and the sputtering took place in a nitrogen ($N_2$) atmosphere at 20 mtorr pressure.

A fast annealing process was used to crystallize the amorphous thin films that were formed by sputtering. The procedure was similar to that of Example 2, except that the holding temperature for the annealing was 500° C. This process reduced the total annealing time to approximately 10 minutes, and subsequently minimized the loss of nitrogen dopants during the crystallization and structure transition process.

Example 9

Characterization of Nitrogen-Doped Tin Oxide Films

XRD analysis of the thin films of Example 8 was performed to examine the crystal structure of the films, using the procedure of Example 3. The XRD patterns of the films indicated a rutile structure. This rutile structure was the same as that of crystallized, undoped tin oxide films.

XPS was used to obtain semi-quantitative data on the chemical compositions of the films of Example 8, using the procedure of Example 4. Multiplex XPS spectra of N 1s, O 1s, and Sn 3d5 were recorded using band-pass energy of 35.75 eV, corresponding to an energy resolution of 1.2 eV. The relative element composition ratios were determined by multiplex high-resolution scans over N 1s, O 1s, and Sn 3d5 spectral regions, and comparing the peak areas of their spectra. In these spectra, peaks for N, O, and Sn were observed. The existence of Ar 2p peaks and the shape deformation of Sn 3d5 peaks likely were caused by the Ar$^+$ ion sputtering used to remove the thin film surface contaminants before conducting the XPS survey, and a C 1s peak was believed to be a consequence of carbon in the environment. The binding energy of N 1s was approximately 397 eV, which was associated with Sn—N bonding, indicating a substitution of O atoms by N atoms. The elemental composition percentages for thin film samples, both of the initial amorphous films and of the films after fast annealing, are summarized in Table 3.

TABLE 3

Elemental Composition Percentages for Nitrogen-Doped Tin Oxide Films

|  | Sn | O | N | N:Sn |
|---|---|---|---|---|
| Amorphous - as deposited by reactive sputtering | 54.29% | 44.26% | 1.45% | 2.671% |
| Crystalline (rutile) - After fast annealing | 53.55% | 45.19% | 1.26% | 2.353% |

From this data, it appears that the fast annealing did not significantly decrease the nitrogen concentration in the film. The amount of nitrogen in the crystalline film was approximately 87% of the amount of nitrogen in the amorphous film. The chemical composition of the crystalline film can be modified by changing the conditions of the annealing. For example, changes in the annealing atmosphere and/or the annealing time may affect the level of nitrogen that is retained in the films. Also, a change in the chemical composition of the initial amorphous film should cause a corresponding change in the chemical composition of the crystalline film.

The chemical composition of the initial amorphous film can be modified by changing the conditions of the reactive sputtering. For example, a pure Sn target could be used, and/or an atmosphere containing a mixture of $N_2$ and $O_2$ could be present. Amorphous doped films formed by the sputtering procedure of Example 8, but with an atmosphere containing a ratio of $N_2$ to $O_2$ of 1:1, provided nitrogen-doped tin oxide with a lower concentration of nitrogen dopant atoms.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method of making a doped metal oxide, comprising:
   heat treating a first doped metal oxide comprising a dopant nonmetal rapid thermal annealing to form a second doped metal oxide, the heat treating comprising:
   heating the first doped metal oxide at a heating rate of from 5°/s to 50°/s to a temperature of from 500° C. to 1,500° C.; and
   maintaining the temperature from 1 minute to 10 minutes; and
   after the heat treating, cooling to a temperature of less than 100° C. within 10 minutes;
   where the crystal structure of the second doped metal oxide is different from the crystal structure of the first doped metal oxide.

2. The method of claim 1, where the dopant nonmetal is selected from the group consisting of boron, carbon, nitrogen, fluorine and chlorine.

3. The method of claim 1, where the atomic ratio of metal to oxygen to dopant nonmetal in the first doped metal oxide is 1:0.5-1.99:0.01-1.5.

4. The method of claim 1, where the atomic ratio of metal to oxygen to dopant nonmetal in the first doped metal oxide is 1:1.8-1.9:0.1-0.2.

5. The method of claim 1, where the atomic ratio of metal to dopant nonmetal in the second doped metal oxide is from 1:0.5-1.99:0.01-1.5.

6. The method of claim 1, where the atomic ratio of metal to oxygen to dopant nonmetal 1:1.88-1.98:0.02-0.12.

7. The method of claim 1, where the amount of dopant nonmetal in the second doped metal oxide is at least 10% of the amount of dopant nonmetal in the first doped metal oxide.

8. The method of claim 1, where the amount of dopant nonmetal in the second doped metal oxide is at least 30% of the amount of dopant nonmetal in the first doped metal oxide.

9. The method of claim 1, where the amount of dopant nonmetal in the second doped metal oxide is at least 85% of the amount of dopant nonmetal in the first doped metal oxide.

10. The method of claim 1, further comprising forming the first doped metal oxide by reactive sputtering.

11. The method of claim 10, where the reactive sputtering comprises sputtering a target comprising the metal or an oxide of the metal in an atmosphere comprising a dopant nonmetal source.

12. The method of claim 11, where the atmosphere further comprises oxygen.

\* \* \* \* \*

UNITED STATES PATENT AND TRADEMARK OFFICE
CERTIFICATE OF CORRECTION

| | | |
|---|---|---|
| PATENT NO. | : 9,120,088 B2 | Page 1 of 1 |
| APPLICATION NO. | : 12/994437 | |
| DATED | : September 1, 2015 | |
| INVENTOR(S) | : Qi Li et al. | |

It is certified that error appears in the above-identified patent and that said Letters Patent is hereby corrected as shown below:

In the Claims

In column 18, claim 1, line 53, before "rapid thermal annealing" insert --by--.

In column 19, claim 6, line 11, after "to dopant nonmetal" insert --is--.

Signed and Sealed this
Third Day of May, 2016

Michelle K. Lee
*Director of the United States Patent and Trademark Office*